2,808,005
DOUBLE-ACTING DIAPHRAGM PUMPS

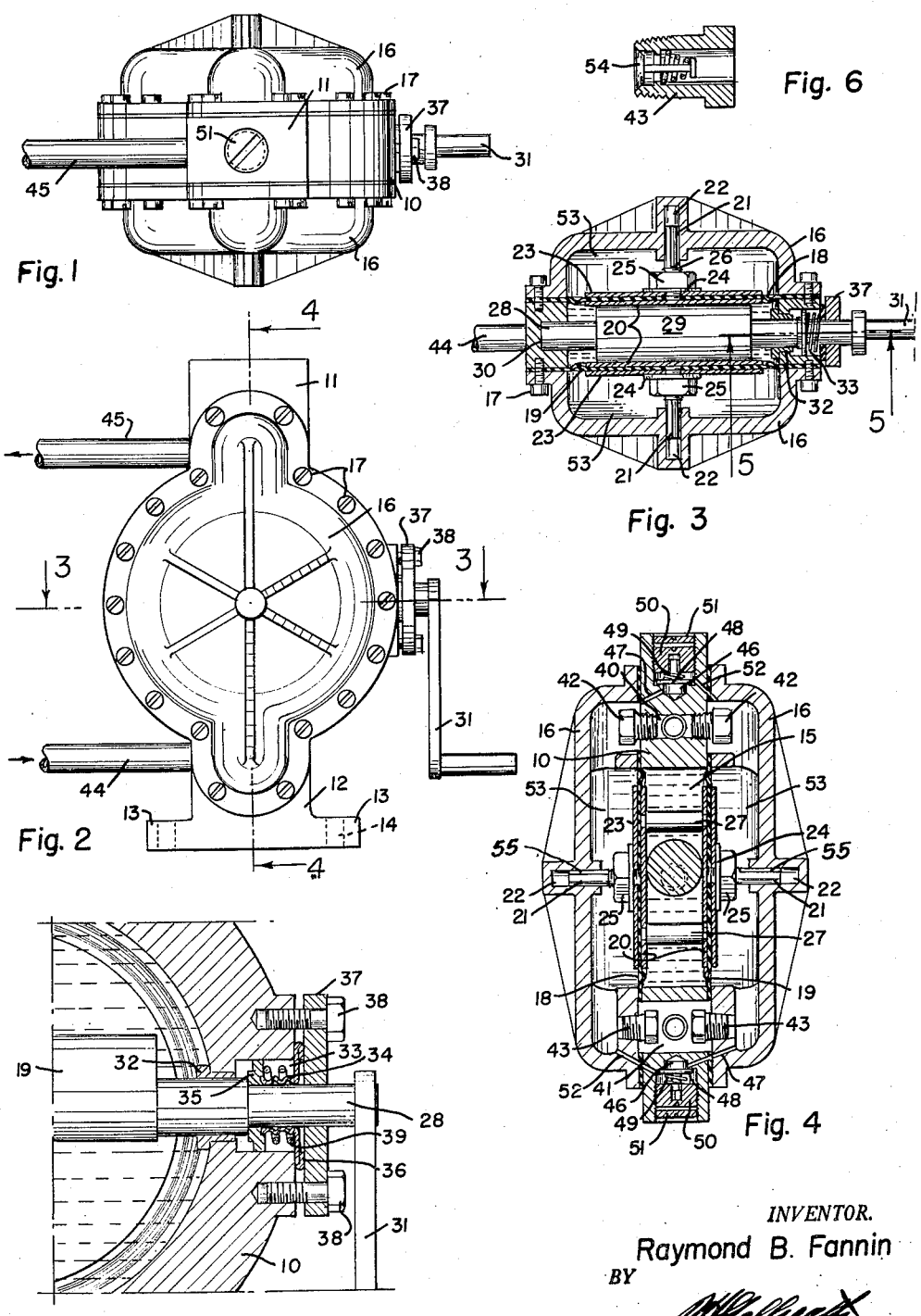

Raymond B. Fannin, Wheatridge, Colo.

Application May 3, 1954, Serial No. 427,030

1 Claim. (Cl. 103—42)

This invention relates to a pump for fluids, vapors or gases and more particularly to a diaphragm type of fluid pump.

The principal object of the invention is to provide an exceedingly simple double diaphragm pump having a single actuating element positioned between the two diaphragms in which the pressure of the incoming fluid will be equalized on both sides of both diaphragms at all times regardless of whether the pump is operating or inoperative, thus enabling the pump to operate as a booster pump on fluids under high initial pressure without stressing the diaphragms or the actuating element by the high incoming pressure.

A still further object is to so construct the pump that the diagram portion thereof will be essentially a chamber of static lubricating oil wherein this chamber of oil will act in the nature of a fluid diaphragm which will transmit the pressure to the fluid being pumped, and which will also serve to continuously lubricate the pump.

A still further object is to provide an adjustable relief valve assembly for a pump of this character which will automatically relieve extreme pressures from one side of the fluid diaphragm to the opposite side thereof.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved pump;

Fig. 2 is a side view thereof;

Fig. 3 is a horizontal section looking downwardly on the line 3—3, Fig. 2;

Fig. 4 is an enlarged vertical section, taken on the line 4—4, Fig. 2;

Fig. 5 is a still further enlarged, fragmentary, detail section, taken on the line 5—5, Fig. 3; and Fig. 6 is a detail sectional view illustrating a type of check valve employed in the improved pump.

The improved pump is assembled about a relatively thick, flat, circular frame portion 10 formed with an upper valve boss 11 and a lower valve boss 12. The lower valve boss 12 is provided with base flanges 13 having suitable bolt holes 14 whereby the pump may be secured upon any desired supporting surface.

The frame portion 10 is formed with a concentric, circular fluid chamber 15 extending completely therethrough. The two sides of the frame portion 10 are closed by means of side plates 16 which are secured to the opposite sides of the frame portion 10 by means of suitable cap screws 17. The two sides of the fluid chamber 15 are closed by means of flexible diaphragms 18 and 19, the peripheral edges of which extend between the side plates 16 and the frame portion 10 to form sealing gaskets therebetween. The side plates are dome-shaped to form an open pumping chamber 53 between each side plate and the adjacent diaphragm.

A circular cam disc 20 is mounted on the inner face of each of the diaphragms 18 and 19. Each cam disc 20 is provided with an axial guide stud 21 which extends outwardly through the center of the adjacent diaphragm, thence outwardly into a guide socket 22 in one of the side plates 16. An outer diaphragm disc 23 is clamped against each diaphragm by means of a clamping washer 24 and a clamping nut 25. The nuts 25 are threaded onto enlarged threaded portions 26 on the studs 21. The discs 20 and 23 are of less diameter than the fluid chamber 15 so that an annular flexible portion of each diaphragm will surround each disc. The two cam plates are maintained in fixed, spaced, parallel relation by means of spacing members 27, the extremities of which are riveted into or otherwise permanently secured to the two cam discs 20. When assembled, the entire space between the two diaphragms 18 and 19 is completely filled with a non-volatile fluid, such as brake-fluid or lubricating oil.

A cam shaft 28 extends medially and horizontally between the two cam discs 20 and is provided with an elongated, eccentric cam portion 29 of a diameter equal to the spacing between the two cam discs 20 and substantially equal in length to the diameters of the latter. The inner extremity of the cam shaft 28 terminates in a bearing socket 30 at one end of the frame portion 10. The other extremity of the cam shaft 28 projects from the frame portion 10 terminating in a hand crank 31, or in any other suitable device for rotating the cam shaft 28.

The crank extremity of the cam shaft 28 extends through a bearing bushing 32 and through a sealing cavity 33. An axially expansible bellows-like collar 34 surrounds the shaft within the cavity 33. The collar terminates at one extremity in a bearing ring 35, which is constantly urged into sealing engagement with a shoulder on the shaft 28, and at its other extremity with an enlarged circular flange 36, which is clamped against the frame portion 10 by means of a clamping plate 37 and suitable cap screws 38. A compression spring 39 constantly urges the sealing ring 35 into tight sealing engagement with the shoulder on the shaft to prevent leakage along the shaft while the expansible collar 34 prevents leakage from the cavity 33 to the shaft or to the exterior of the pump.

An outlet chamber 40 is formed in the frame portion 10 above the fluid chamber 15, and an inlet chamber 41 is formed therein below the chamber 15. A conventional check valve fitting 42 is threaded into the frame portion 10 at each side of the outlet chamber 40, and a similar check valve fitting 43 is threaded into each of the side plates 16 within the inlet chamber 41. An inlet conduit 44 communicates with the inlet chamber 41, and an outlet conduit 45 communicates with the outlet chamber 40.

It can be seen that if the shaft 28 be rotated, the eccentricity of the cam portion 29 will cause the two cam discs 20 and their associated diaphragms to move from side to side as a unit. In moving from side to side, they will alternately draw fluid through the intake conduit 44 and the check valve fittings 43 and discharge this fluid through the check valve fittings 42 and the discharge conduit 45.

The pressure against the medial portions of each diaphragm will, of course, be resisted by the rigid discs 20 and 23. The pressure against the annular flexible portions of the diaphragm will be transmitted through the incompressible fluid between the diaphragms to the opposite diaphragm so that the flexible portions of the two diaphragms will act as a unit in cooperation with the fluid therebetween to resist rupture of the diaphragm and to transmit the pressure uniformly over the entire areas of both diaphragms. It will be noted that the diaphragms are maintained permanently parallel and permanently tangent to the cam portion 29 by the sliding guide studs 21 and their guide sockets 22.

Regulatable means are provided for presetting the maximum pressure to be delivered at the outlet conduit 45. This is accomplished by forming a by-pass chamber 46 in each valve boss 11 and 12. A pressure passage 47 extends from each pumping chamber 53 to one of the by-pass chambers 46. A relief valve 48 is constantly urged to close each of the chambers 46 by means of a compression spring 49 acting against threaded guide bushings 50, there being one of the bushings 50 threaded into each of the bosses 11 and 12. The relief valves are provided with stems which slidably engage the bushings 50. The threaded cavities, into which the bushings 50 are threaded, are closed by means of threaded plugs 51. A relief passage 52 extends from each pumping chamber 53 to the space between each relief valve and its threaded bushing 50.

The pressure required to open the relief valves can be preset by rotating the bushings 50 to regulate the compression in the springs 49. It can be seen that should the pressure in either pumping chamber 53 exceed a predetermined pressure, the fluid being pumped will flow through the pressure passage 47 from the chamber past the relief valve 48 and through the relief passage 52 to the opposite chamber.

Since only the differential in pressures, not the incoming pressure, places any stress on the diaphragms, the relief valves may be set to protect the diaphragms and assure long pump life.

If the pump is used upon corrosive liquids or vapors, the outer faces of the diaphragms may be faced with suitable material for resisting corrosion while the inner faces thereof could be faced with material suitable for retaining the lubricating oil or other fluid medium between the diaphragms. As an example, in pumping ammonia, natural rubber would be satisfactory for the outer faces while neoprene would be more satisfactory for the inner faces.

The check valve fittings are of a conventional type containing a spring closed check valve 54 such as illustrated in Fig. 6. A keyway 55 is cut in each guide stud 21 to bleed fluid from the guide sockets 22.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A pump comprising: a frame member having a medially positioned circular fluid chamber extending transversely therethrough; a flexible diaphragm closing each side of said fluid chamber; a side plate secured to each side of said frame member in spaced relation to the adjacent diaphragm and forming a pumping chamber exteriorly of each diaphragm; a cam plate mounted on the inner face of each diaphragm; a cam shaft extending diametrically of said fluid chamber intermediate said diaphragms; an eccentric cam on said cam shaft between said cam plates; a static fluid completely filling said fluid chamber between said diaphragms; an intake chamber; a discharge chamber, said chambers being formed in said frame member adjacent said fluid chamber; a first pair of check valves positioned between said pumping chambers and said discharge chamber and allowing fluid to alternately flow from the former to the latter; a second pair of check valves positioned between said intake chamber and said pumping chambers and allowing fluid to flow from the former to the latter; two by-pass passages formed in said frame member, each passage communicating between the two pumping chambers; a relief valve in each by-pass passage, each relief valve allowing fluid to flow in a direction opposite to the other relief valve; and spring means urging said relief valves closed.

References Cited in the file of this patent

UNITED STATES PATENTS

| | | |
|---|---|---|
| 1,147,286 | Welch | July 20, 1915 |
| 1,206,943 | Tarbet | Dec. 5, 1916 |
| 1,851,666 | Evans | Mar. 29, 1932 |

FOREIGN PATENTS

| | | |
|---|---|---|
| 13,844 | Norway | Feb. 27, 1905 |
| 255,427 | Great Britain | Oct. 3, 1927 |
| 268,554 | Germany | Jan. 23, 1912 |
| 925,748 | France | Sept. 11, 1947 |